US006585248B2

(12) United States Patent
Baud

(10) Patent No.: US 6,585,248 B2
(45) Date of Patent: Jul. 1, 2003

(54) UNIVERSAL SKI AND SNOWBOARD PORTABLE TUNING SYSTEM

(76) Inventor: Gary C. Baud, P.O. Box 5433, Wakefield, RI (US) 02880

( * ) Notice: Subject to any disclaimer, the term of this patent is extended or adjusted under 35 U.S.C. 154(b) by 0 days.

(21) Appl. No.: 10/230,518

(22) Filed: Aug. 29, 2002

(65) Prior Publication Data

US 2003/0042663 A1 Mar. 6, 2003

Related U.S. Application Data

(60) Provisional application No. 60/316,084, filed on Aug. 30, 2001.

(51) Int. Cl.[7] .................................................. B23Q 3/00

(52) U.S. Cl. ..................... 269/296; 269/289 R; 269/16; 269/906

(58) Field of Search .......................... 144/286; 269/296, 269/289 R, 16, 906, 901

(56) References Cited

U.S. PATENT DOCUMENTS 3,963,234 A * 6/1976 Bejtlich ...................... 269/296
4,335,765 A * 6/1982 Murphy ...................... 144/286
5,829,501 A * 11/1998 DeVito ....................... 144/286
5,848,783 A * 12/1998 Weissenborn ............... 269/296

* cited by examiner

*Primary Examiner*—Lee D. Wilson
(74) *Attorney, Agent, or Firm*—Barlow, Josephs & Holmes, Ltd.

(57) ABSTRACT

The present invention provides a new and improved portable ski and snowboard tuning table that can be employed with skis or snowboards of any length, width or binding style including downhill, telemark or cross-country. In addition, the device allows the skis or snowboards to be installed in either a horizontal or side mounted fashion depending on the user's preference. The device is integrated to include storage for all of the tools required to tune the skis as well as being completely portable in a compact package. The lower surface of the work surface has four legs that are pivotally connected and can be selectable rotated to either a retracted position beneath the work surface or an extended position for use of the table. The ski supports only support the skis from the lower surface and do not wrap around the edges of the ski providing an obstruction to the optimal full stroke tuning method. In cooperation with the end supports, a binding insert is used to retain the ski on the tuning bench while providing the user full access to three sides of the ski.

11 Claims, 10 Drawing Sheets

10
62
64
28
32
22
26
24
18
16
56
14
52
30
12
50
34
44
48

UNIVERSAL SKI AND SNOWBOARD PORTABLE TUNING SYSTEM

CROSS-REFERENCE TO RELATED APPLICATIONS

This application is related to and claims priority from earlier filed provisional patent application No. 60/316,084, filed Aug. 30, 2001.

BACKGROUND OF THE INVENTION

The present invention relates to a portable device for supporting skis and snowboards during the tuning process thereof. More specifically, this invention relates to a collapsible device that allows a user to tune a pair of skis or a snowboard in any location using the portable ski and snowboard tuning table of the present invention.

Currently, the use of ski tuning and clamping devices is well known in the prior art. A number of prior art ski tuning devices have been devised and utilized for the purpose of tuning skis and are known to consist basically of familiar, expected and obvious structural configurations, notwithstanding the myriad of designs encompassed by the crowded prior art which have been developed for the fulfillment of countless specific objectives and requirements.

Nearly all of these devices include a central component for clamping the ski in place and two end support components for holding and stabilizing the front and rear ends of the ski while the edges are filed and the bottom is waxed. By way of example, U.S. Pat. No. 5,150,887, issued to Weissenborn et al., discloses a ski holding device that is mounted to a table, if one is available, that includes two end supports that also must be mounted to the table to keep the ski tip and tail from flexing during the tuning process. U.S. Pat. No. 4,679,356, issued to Thomas, discloses an automatic ski-tuning device. U.S. Pat. No. 4,601,220, issued to Yurick, Jr., discloses a ski edge tuning tool. U.S. Pat. No. 4,557,030, issued to Gaston et al., discloses a multipurpose apparatus and method for tuning and grooving a ski. Finally, U.S. Pat. No. 3,834,250, issued to Fonas, discloses a method and apparatus for tuning a pair of skis.

The difficulty with all of the cited the prior art devices is that while they all fulfill their respective, particular objectives and requirements, none of them describe a portable ski and snowboard tuning table for allowing a user to tune a pair of skis or a snowboard in any location. A major drawback to all of these devices is that they must generally be mounted to an additionally required workbench. This is particularly inconvenient because skis are occasionally tuned at the top of an alpine run on a mountain side in the snow. Generally, benches are not readily available at the top of a ski slope and bringing them to the required location requires a great deal of effort and advanced planning. In addition, while U.S. Pat. No. 5,709,373 issued to Wasylynko discloses a portable table for tuning skis, the clamping devices are inefficient in that they wrap over the edges and bottom of the ski to hold the ski in place during tuning thus interfering with the ability of the tuner to have full, unimpeded access to the components of the ski being tuned. Also, vices cannot be used with the new trapezoidal or cap style skis where the top of the ski is not flat. In this manner, it prevents the individual who is tuning the ski to apply full smooth strokes to both the edges and bottom of the ski when filing the edges or applying wax. Another drawback to the Wasylynko device is that the device is not self-contained, when broken down the device has several individual components that all must be handled separately, thus interfering with true portability.

Finally, none of the prior art devices allow a user to employ the device with equal effectiveness to alpine skis as well as the wide variety of short powder skis, telemarking skis and snowboards. This is a large drawback to the prior art devices given the increased popularity related to the traditional alpine ski alternatives such as snowboards.

Therefore, it can be appreciated that there exists a continuing need for new and improved portable ski and snowboard tuning table which is self contained, easily portable and can be used for allowing a user to tune a pair of skis or a snowboard in any location. In addition, there is a need for a portable ski tuning table that firmly holds the ski or snowboard in place while allowing the user unobstructed access to the bottom surface and edges. Further there is a need for a ski tuning bench that is light, simple to use and compact enough to be fully portable.

BRIEF SUMMARY OF THE INVENTION

In this regard, the present invention provides a new and improved portable ski and snowboard tuning table, which has all the advantages of the prior art and none of the disadvantages. The present invention provides an integrated system that can be employed with skis or snowboards of any length, width or binding style including downhill, telemark or cross-country. In addition, the device allows the skis or snowboards to be installed in either a horizontal or side mounted fashion depending on the user's preference. The device is integrated to include storage for all of the tools required to tune the skis as well as being completely portable in a compact package.

The present invention essentially comprises a horizontal work surface, the upper surface of which has access holes to storage compartments, a central opening through which a clamping device is inserted and end sections onto which end supports are mounted. The supports on the end sections of the bench pivot inwardly and outwardly and can be placed in several locations along the work surface of the bench to accommodate varying length skis and to allow the bench to have a smaller profile when collapsed for transport. Further, the supports only support the skis from the lower surface and do not wrap around the edges of the ski providing an obstruction to the optimal full stroke tuning method. In cooperation with the end supports, a binding insert is used to retain the ski on the tuning bench while providing the user full access to three sides of the ski. In addition, this insert allows the user to adjust the tension of the ski in the tuning bench to provide a slight camber if desired and to accommodate skis having various thicknesses and different binding riser plates from a single centrally controlled location.

The lower surface of the work surface has four legs that are pivotally connected and can be selectable rotated to either a retracted position beneath the work surface or an extended position for use of the table. The legs also are reversible having rubber tips on one end for indoor use and pointed tips on the opposite end for outdoor use on icy conditions. The storage compartments are located on the interior of the work surface and are designed to contain all of the clamping components and required tuning tools when they are not in use, allowing the present invention to be both conveniently portable and self-contained. Covers are installed over the compartment openings to retain the components stored within during transport and storage and provide a level working surface when the device is in use. Additionally, a tool pouch is provided to contain the tools in a readily accessible location beneath the device when in operation.

Accordingly, one of the objects of the present invention is the provision of completely self-contained and portable ski tuning bench that provides integrated storage for all of the components necessary for tuning skis. Another object of the present invention is the provision of a tuning bench that can be used with equal efficacy with any type of ski or snowboard. Yet another object of the present invention is the provision of a tuning bench that can firmly retain the ski or snowboard being tuned while providing unobstructed access to both edges and the bottom surface without requiring the supports to be moved. A further object of the present invention is the provision of a universal ski tuning system that is completely portable that includes integral tool storage in addition to allowing the user to mount the ski or snowboard in either a vertical or horizontal position.

Other objects, features and advantages of the invention shall become apparent as the description thereof proceeds when considered in connection with the accompanying illustrative drawings.

BRIEF DESCRIPTION OF THE DRAWINGS

In the drawings which illustrate the best mode presently contemplated for carrying out the present invention.

DETAILED DESCRIPTION OF THE INVENTION

Figure 1:
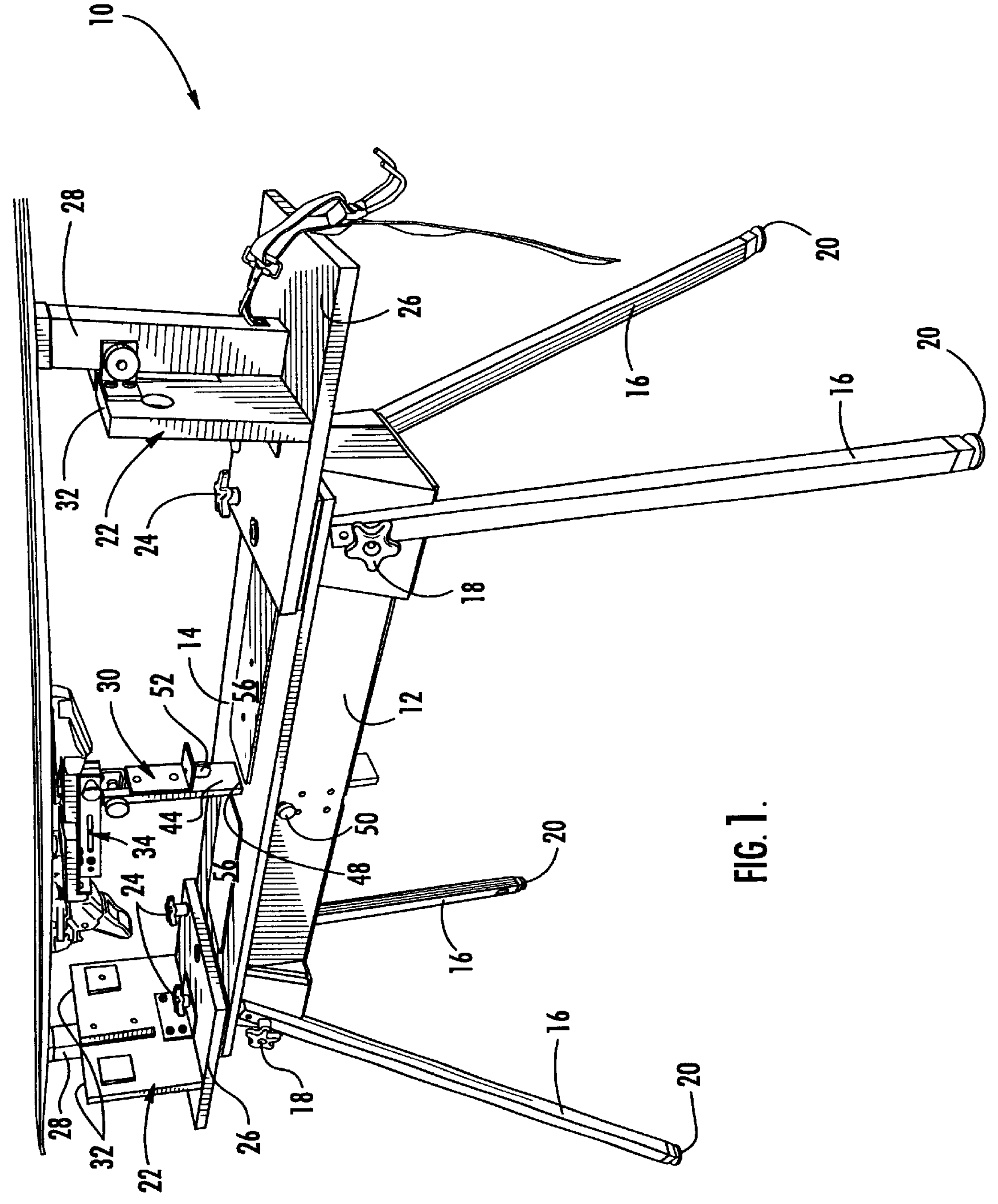
FIG. 1 is a perspective view of the portable ski-tuning bench of the present invention.
Figure 2:
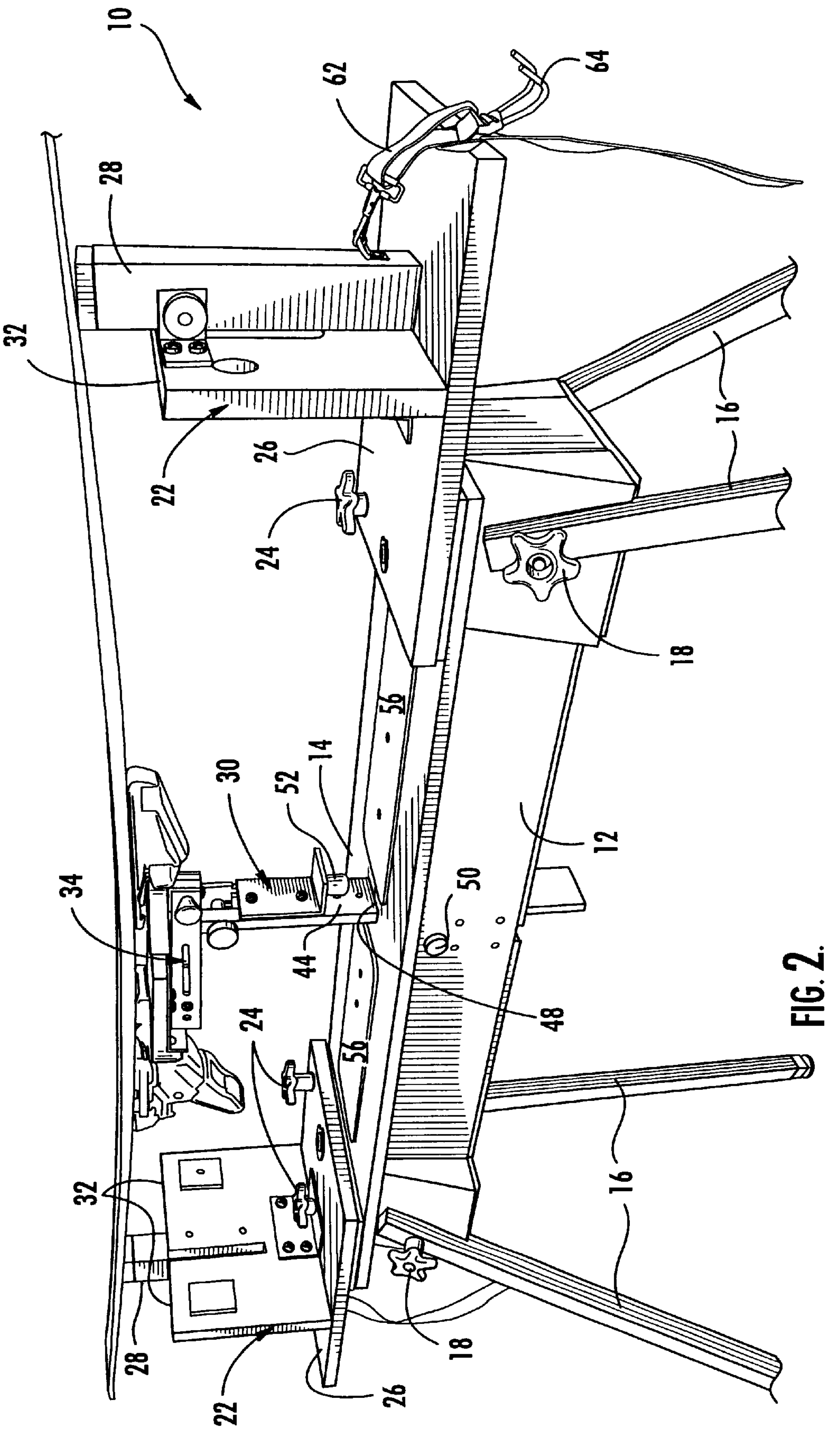
FIG. 2 is a perspective view thereof with a downhill ski mounted horizontally therein.
Figure 3:
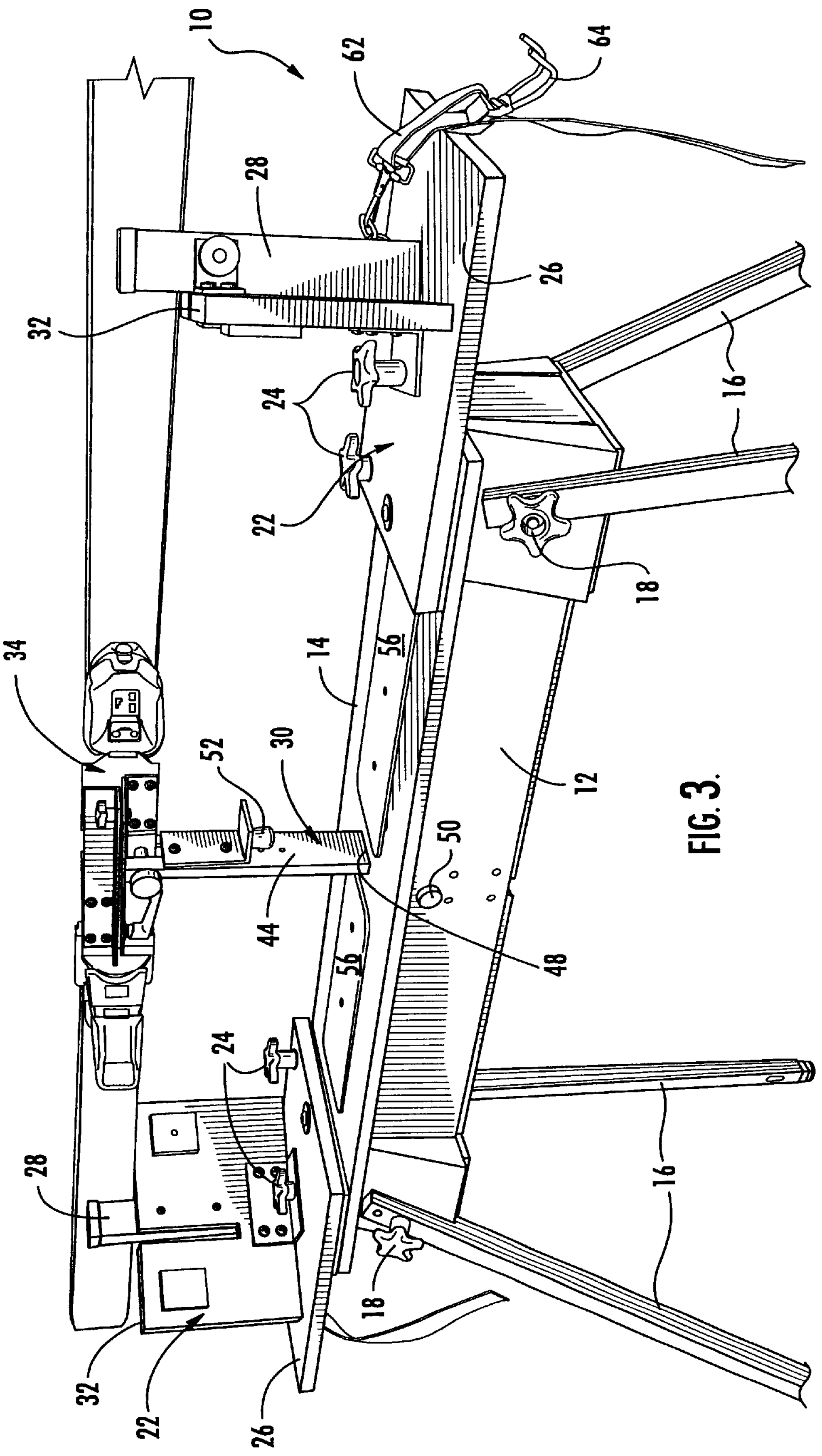
FIG. 3 is a perspective view thereof with a downhill ski mounted vertically therein.
Figure 9:
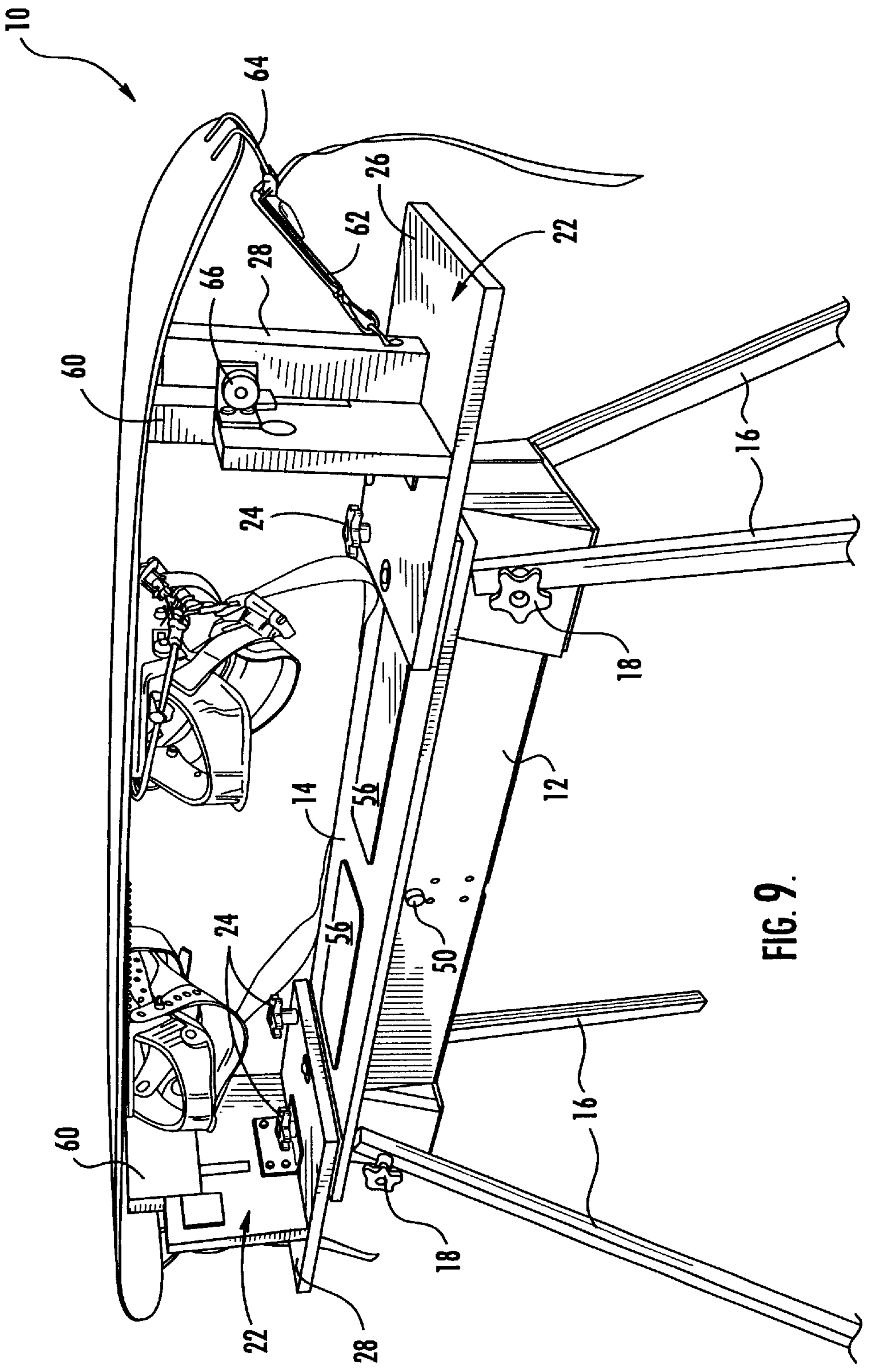
FIG. 9 is a perspective view of the ski tuning bench of FIG. 1 with a snow board mounted horizontally therein.
Figure 10:
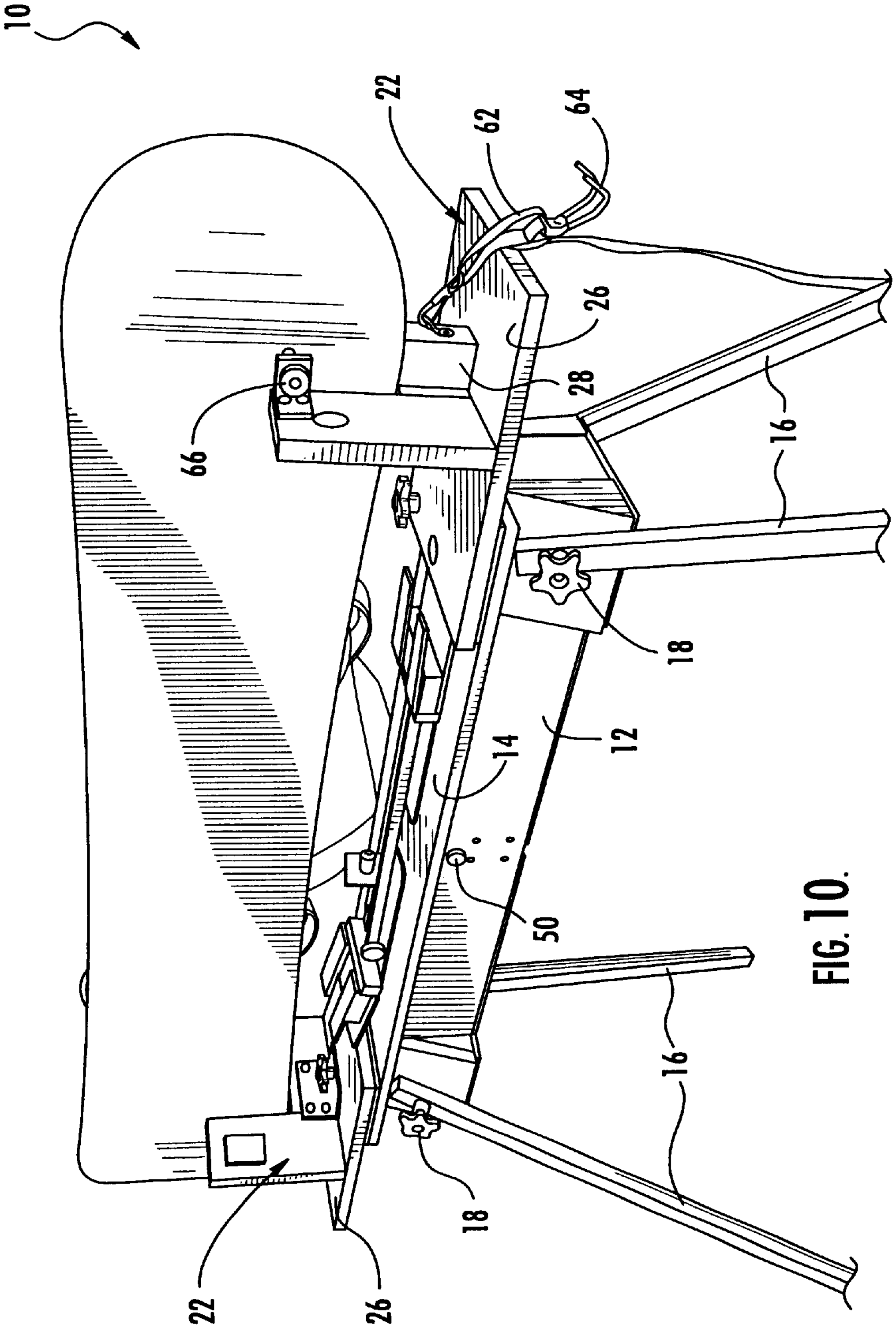
FIG. 10 is a perspective view of the ski-tuning bench of FIG. 1 with a snowboard mounted vertically therein.

Referring now to the drawings, the universal ski tuning system of the present invention is generally shown in FIGS. 1–3. FIGS. 4–8 generally show operational details of the present invention. Finally, FIGS. 9 and 10 show the present invention in use with a snowboard. The universal tuning bench is generally indicated at 10. As will hereinafter be more fully described, the tuning bench 10 generally includes a storage box 12 with a work surface 14 installed on the top thereof. Retractable legs 16 are connected to the sides of the storage box 12 to allow the bench 10 to be set-up at a comfortable working height for the user. A universal support and clamping system, as will be more fully described below, is provided on the top of the work surface 14 that provides support for the front and tail ends of the skis or snowboards but also provides tensioning to retain the equipment in the bench 10 for the tuning process. Further, the support and clamping system is fully adjustable to accommodate a wide range of ski and snowboard shapes and sizes as well as binding configurations. In operation, the bench 10 is universal in application to all types of alpine equipment while also being completely collapsible, making it easily portable thereby creating a convenient and economical self-contained ski tuning bench 10 that has not been previously available in the prior art.

Turning to FIG. 1, the universal tuning bench 10 is shown with a conventional down hill alpine ski installed in a horizontal position for tuning. The bench 10 consists of a storage box 12 with a work surface installed 14 on the top of the box 12. The storage box 12 is provided to contain any tuning tools required in the ski tuning process such as files, screwdrivers, scrapers, waxes and heaters in a convenient location integral to the ski-tuning bench 10. In this manner, all of the tools and any of the optional, removable components of the bench 10, as are indicated below, can be placed in the storage box 12 and retained in one package for portability. This feature is an important improvement over the prior art where all of the accessories and tools had to be transported separately.

The support legs 16 of the ski-tuning bench 10 are pivotally connected to the sides of the storage box 12 using a threaded fastener and a thumbscrew 18. The legs 16 are a tubular material and can be placed in either an extended position depending downwardly from the bench 10 allowing the bench to be set up in any location for use. In addition, the legs 16 can be pivoted upwardly under the edge of the work surface 14 in a compact storage position for transport. The thumbscrews 18 are tightened against the legs 16 to retain them in grooves in the sides of the storage box 12 in the desired position making the tuning bench 10 a stable work platform. It can be seen in FIG. 2 that the edges of the work surface 14 extend beyond the edges of the storage box 12. Since the legs 16 are mounted against the sides of the storage box 12, this overhanging feature provides protection for the thumbscrews 18 and the legs 16 thereby preventing any falling debris or wax from building up on these surfaces. The support legs 16 are also reversible, having rubber feet 20 on one end thereof to provide for use of the ski tuning bench 10 of the present invention on finished floor surfaces without scratching or marring them. On the opposite end of the legs 16, spikes (not shown) are provided so that the ski-tuning bench 10 can be set up and used on the icy conditions usually encountered on the mountainside ski slopes while keeping the bench 10 firmly in place and manintaining its stability.

Two universal end supports 22 are provided on each end of the work surface. The end supports 22 are pivotally mounted onto the work surface 14 and fastened in the desired location using thumbscrews 24. The ability to pivot the end supports 22 serves several purposes. First, they can be pivoted inwardly for storage and portability. Further, by allowing the end supports 22 to pivot inwardly by a full 180° the supports 22 have a closer spacing so that the bench 10 can support shorter skis such as children's skis or the shorter, wider powder skis that are currently popular. Finally, by slightly pivoting the end supports 22 the skis can be tensioned and retained on the bench 10 when installed in the vertical position as will be more fully described below.

The bottom support surface 26 of the end supports 22 is slightly elevated from the work surface 14 to allow them to freely rotate over the work surface 14 even if there is a build up of wax on the surface 14. The universal end supports 22 also include several features that facilitate their use with a variety of different equipment and binding configurations. Turning to FIGS. 1 and 2 the ski bench 10 can be seen in use with a conventional high performance downhill alpine type ski. Posts 28 are provided on the end supports 22 upon which the tip and tail of the ski rests. The posts 28 are narrower than the overall width of the ski so as not to obstruct full and unimpeded access to the edges of the ski. The clamping assembly 30 cooperates with the end supports 22 to firmly retain the ski in position. In FIG. 2, the clamping assembly 30 is shown engaged, slightly flexing the ski causing the tip and tail of the ski to exert downward pressure on the posts 28 of the end supports 22. In this manner, it can be seen that the ski is retained in in such a way as to allow access to all of the side and bottom surfaces of the ski so that a person tuning the ski can use continuous smooth strokes to sharpen the edges of the ski and to apply wax to the bottom of the ski.

Turning to FIG. 3, the present invention 10 is shown with a conventional downhill ski installed in a vertical position as may be the preference of the user. In this fashion, the center of the ski is rigidly maintained in position by the clamping assembly 30 and the end supports 20 are slightly pivoted to exert outward pressure against the tip and tail of the ski. Again, as can be seen the posts 28 on the end supports 22 are lower than the edge of the ski allowing uninterrupted access to the edge of the ski. Further, on either side of the support post 28 the end supports 22 have shoulders 32 provided where both skis in the pair can be placed after the edges have been tuned so that wax can be evenly applied to the bottom surface of the skis. This feature allows both skis to be waxed simultaneously thereby saving time for the user of the table 10.

Figure 4:
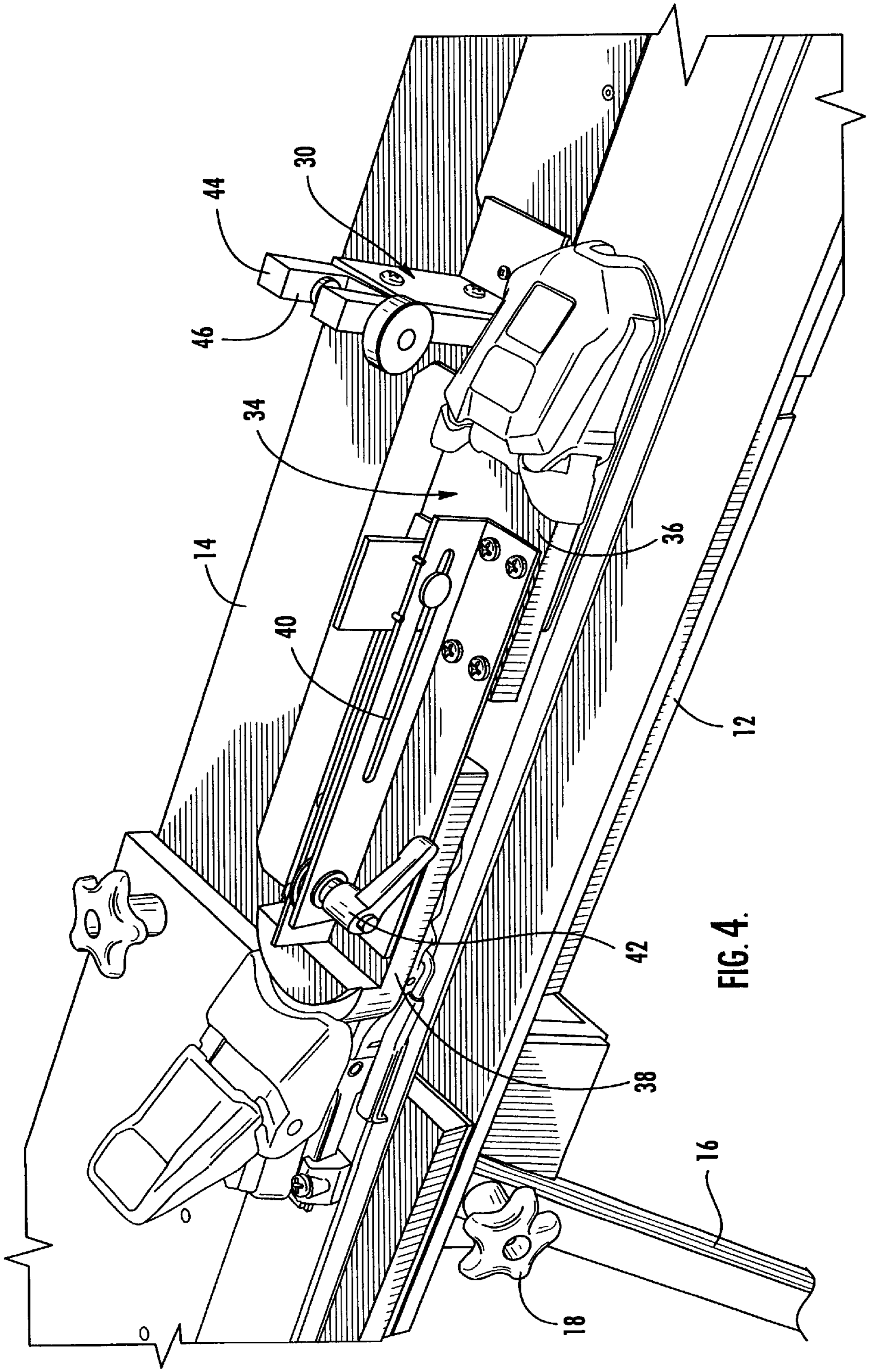
FIG. 4 is a perspective view from the adjustable binding insert of the present invention.

Turning now to FIG. 4, a close up view of the clamping assembly 30 is shown with a boot dummy 34 insert for use with traditional alpine style ski bindings. The clamping assembly 30 has two components. The first component is a boot dummy 34. The boot dummy 34 engages the binding of the ski in the same manner that a ski boot engages the binding. The boot dummy 34 has a toe portion 36 with a lip that is latched under the toe of the ski binding and a heel portion 38 with a corresponding lip to engage the spring-loaded rear portion of the binding. The heel 38 and toe 36 portions of the boot dummy 34 are interconnected using a central section 40 that is slidable to allow the user to freely adjust the length of the boot dummy 34 to accommodate the length and preset dimensions of the binding on any ski being tuned. In operation, the boot dummy 34 is set to the size of the binding snapped into place as a ski boot would be snapped into place. Alternatively, the binding of the ski can be latched in the closed position. The latching mechanism 42 on the central section 40 of the boot dummy 34 is loosened allowing the heel 38 and toe 36 to slide freely relative to one another. The boot dummy 34 is placed into the binding, the toe 36 and heel 38 portions are slid apart to firmly engage the binding, and the latching mechanism 42 is tightened. In this manner, the boot dummy 34 is firmly engaged with the ski to be tuned. The second component of the clamping mechanism 30 is the clamping bar 44. The clamping bar 44 has a slot 46 on one end to receive the central portion 40 of the boot dummy 34. The bar 44 can be attached to the ski perpendicular or parallel to the bottom surface of the ski allowing the ski to be mounted onto the bench 10 in either a vertical or horizontal position as described above. The other end of the clamping bar 44 extends through a hole 48 in the top center of the work surface 14 where it is frictionally engaged by a threaded thumbscrew 50. The ski is placed onto the ski bench 10 as shown in FIGS. 2 or 3 and the clamping bar 44 is placed into the opening 48 in the work surface 14. Once the desired tension is placed on the ski, the thumbscrew 50 is tightened locking the clamping assembly 30 in place. It can be further seen that a stop mechanism 52 is provided on the clamping bar 44 to prevent it from dropping complete through the opening 48 in the work surface 14 or pinching the hands of the user should the clamping bar 44 be unintentionally released from the boot dummy 34. Vertical adjustment of the clamping bar 44 allows a centrally located single control for adjusting the bench 10 to the required dimension for various ski and riser thicknesses.

Figure 5:
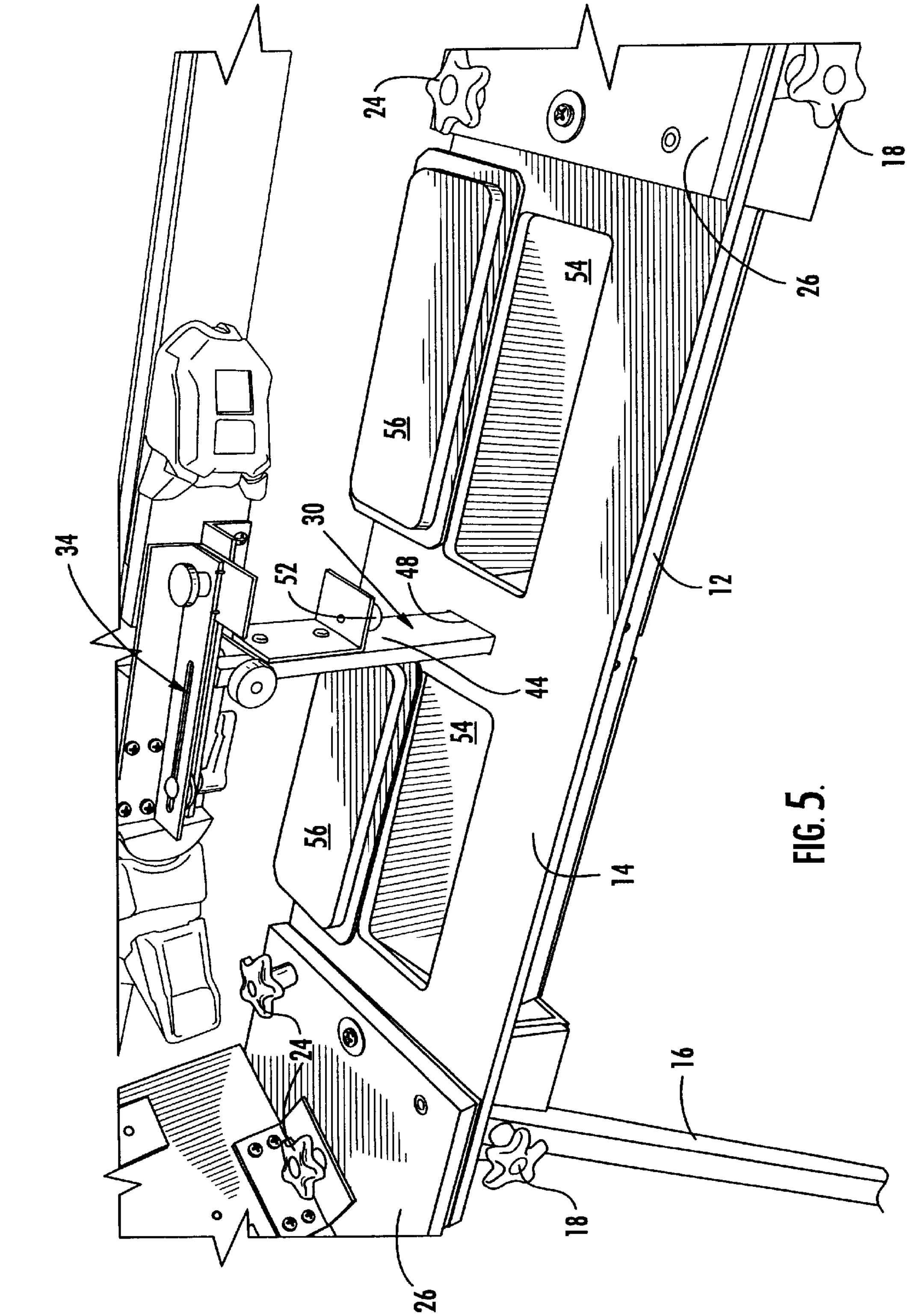
FIG. 5 is a perspective view of the storage compartments of the ski-tuning bench of FIG. 1.

FIG. 5 illustrates the storage compartments 54 provided in the ski-tuning bench 10 of the present invention. The storage compartments 54 are located on the interior of the storage box 12. Access to the storage compartments 54 is provided through openings in the top of the work surface 14. Covers 56 are provided to keep debris from the tuning process out of the storage compartments 54. Further, the covers 56 are provided to retain any tools required for the tuning of the alpine equipment in addition to the components of the clamping assembly 30 and the additional components for the end supports 22. Once these components are placed into the storage compartment 54, the covers 56 are installed so that all of the parts remain in the storage compartment 54 during transport and handling of the ski-tuning bench 10.

Figure 6:
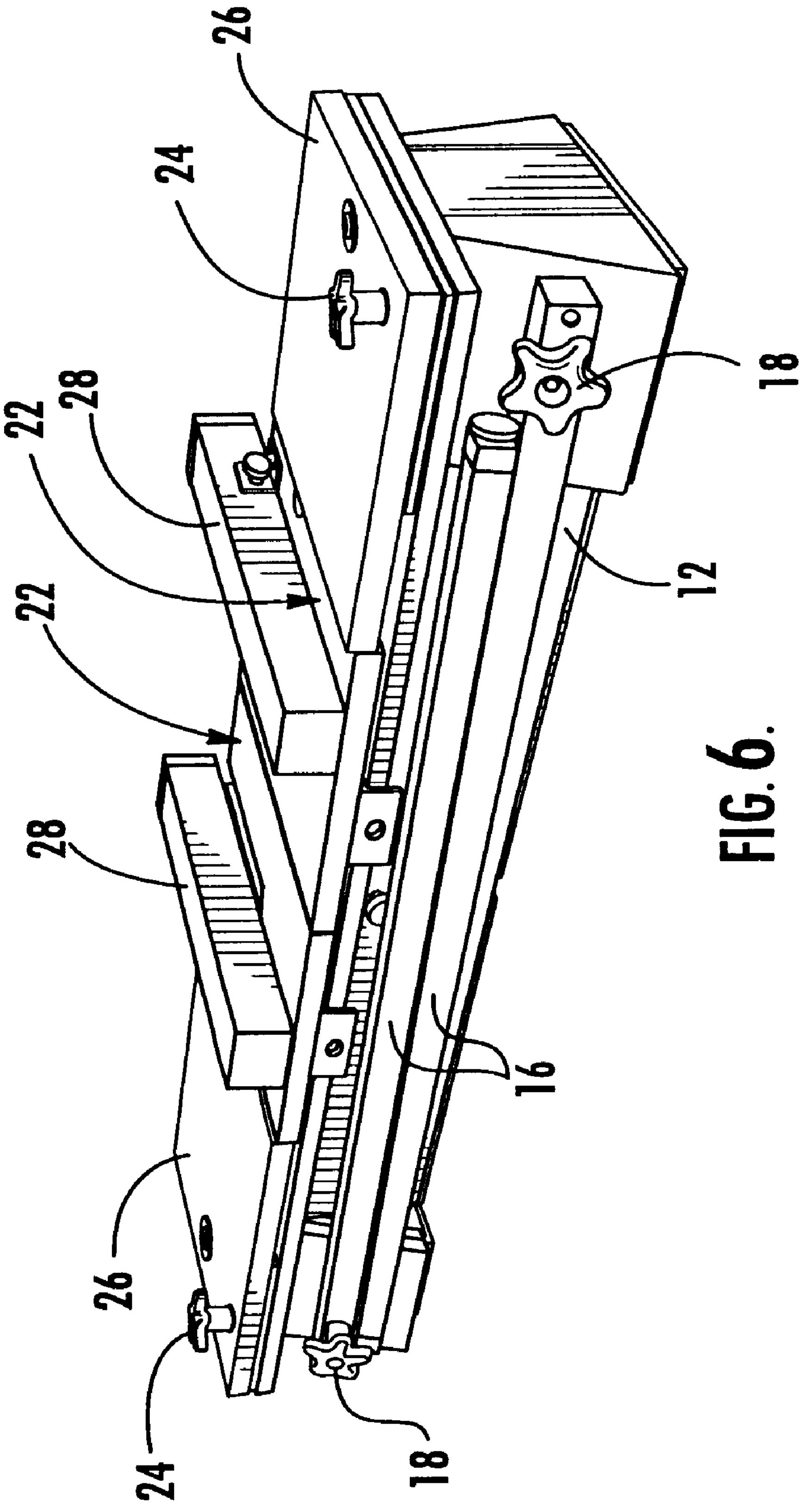
FIG. 6 is a perspective view thereof in a folded position ready for transport.

Turning now to FIG. 6, the ski-tuning bench 10 of the present invention is shown in a completely collapsed and folded position ready for transport. As can be seen, the clamping assembly 30 has been removed and placed in the storage compartment 54. The storage compartment 54 covers 56 are installed. The end supports 22 are rotated inwardly and secured in a flat position and the legs 16 are folded up under the work surface 14. In this manner, the ski-tuning bench 10 is completely collapsed and ready for transport. This is an important feature of the present invention because often this type device needs to be transportable by plane, train or automobile and useable in a minimal amount of space. For this reason a compact, portable, self-contained device is necessary to allow convenience of transport and ease of set up and use.

Figure 7:
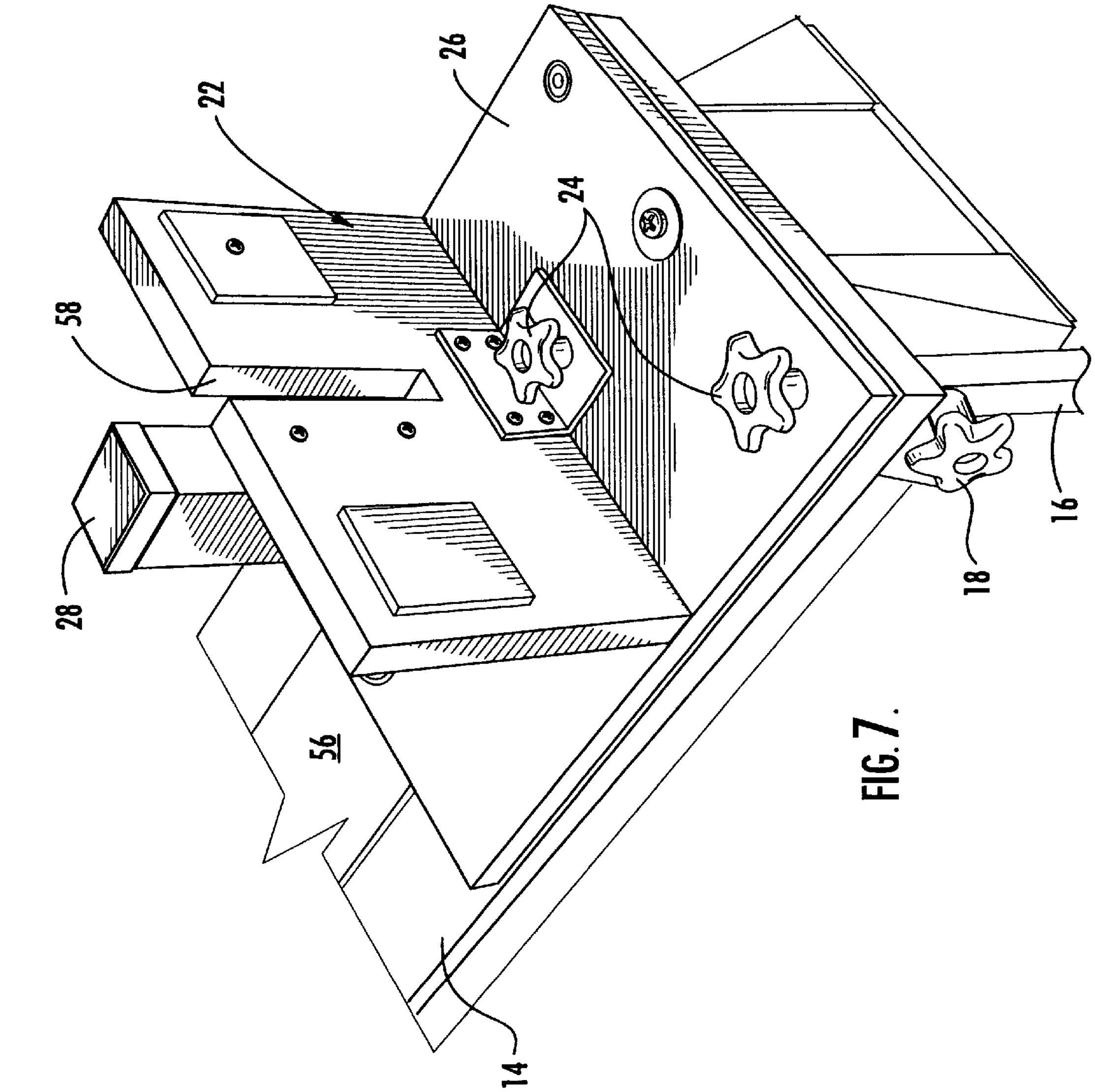
FIG. 7 is a perspective view of the end of the ski-tuning bench of FIG. 1 with the end supports pivoted in an inward position.
Figure 8:
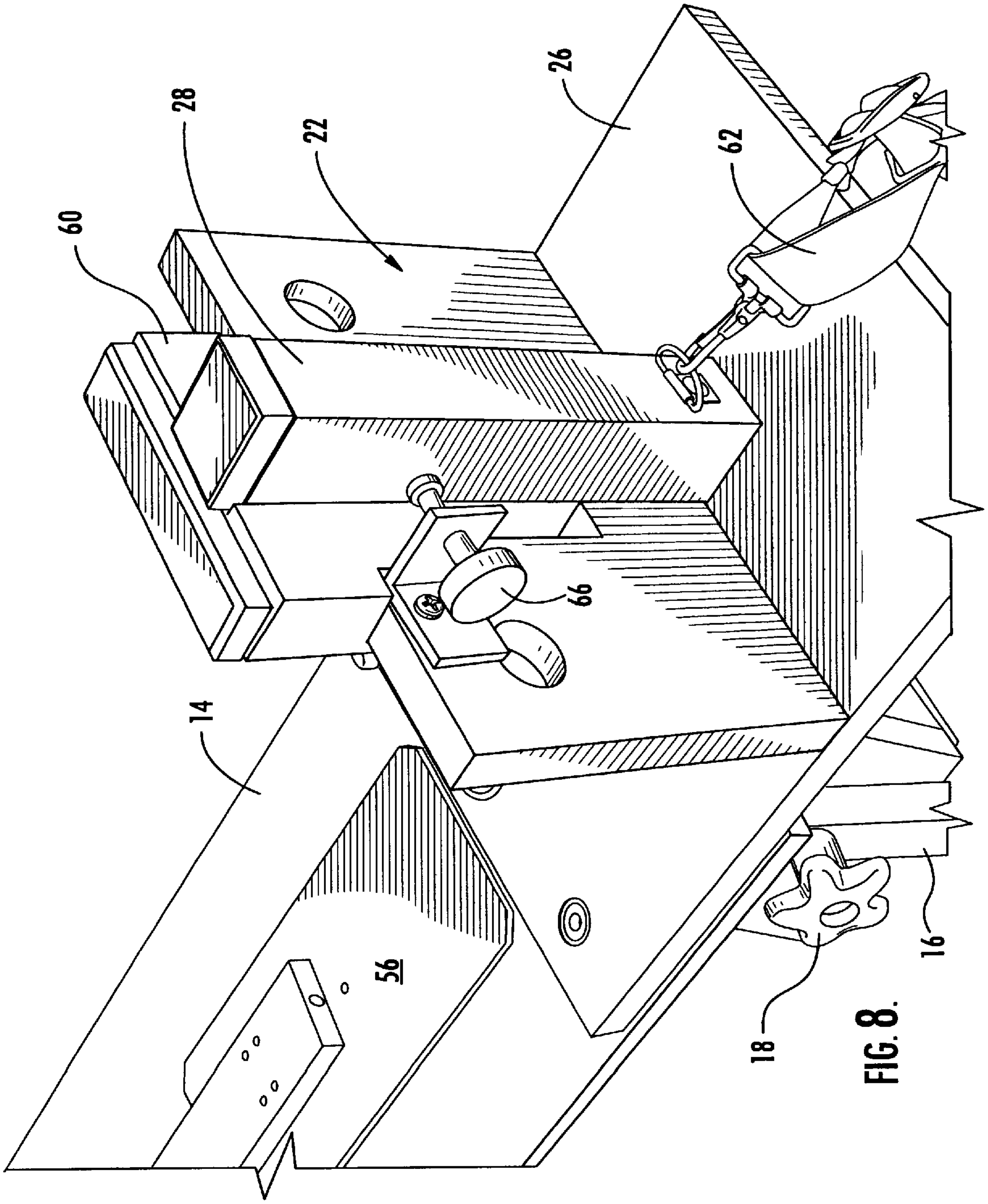
FIG. 8 is a perspective view of the end of the ski-tuning bench of FIG. 1 with the snowboard end supports installed.

FIGS. 7 and 8 are close up views of the end supports 22 of the present invention 10. In FIG. 7 the end supports 22 are shown clearly illustrating slots 58 into which a ski or snowboard can be installed in a vertical position. Once the equipment is placed into the slot 58, the end supports 22 can be rotated as earlier described to place tension onto the equipment and firmly retain it within the device 10. This feature allows the device of the present invention 10 to be employed with alpine equipment that does not include the traditional downhill alpine ski binding. For example, since cross-country and telemark skis have a different binding, a modified boot dummy 34 can be inserted, they can be tuned on the universal tuning bench 10 of the present invention in this manner. FIG. 8 shows a wide end cap 60 installed onto the end support 22. The wide end cap 60 is used when the user desires to tune a snowboard in the horizontal position.

The universal tuning bench 10 of the present invention is shown in FIGS. 9 and 10 with a snowboard installed thereon. In FIG. 9, the snowboard is shown in a horizontal position. As described above, the wide end caps 60 are installed onto the end supports 22 and the snowboard is in turn placed onto the end caps 60. Retaining straps 62 are provided with end hooks 64 to latch over the ends of the snowboard and retain the snowboard in place during the tuning operation. FIG. 10 shows the snowboard installed vertically using the slots 58 described above to retain and support the snowboard for the tuning process. Additional tensioning screws 66 are provided to retain the snowboard in the slot 58 is desired.

It can be seen that an important aspect of the present invention is that it firmly retains skis or snowboards without obstructing access to the edges or bottom surface. This is an advantage that allows the edges to be sharpened and the bottom waxed in a smooth and uninterrupted motion without having to reposition the ski or snowboard in the device 10. In addition, the present invention 10 is entirely self-contained allowing any required components to be stored as an integral component of the present invention thus allowing complete portability.

It can therefore be seen that the present invention provides a unique and novel universal alpine equipment tuning bench 10 that is completely self-contained and portable unlike the devices in the prior art. Further, the present invention can be used with equal efficiency for the tuning of any type of ski or snowboard and in any location. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A portable ski and snowboard tuning device for allowing a user to tune alpine equipment in any location comprising, in combination:

a storage box having a top edge;

a horizontal work platform having a top surface, a first end and a second end, said work platform mounted on said top edge of said storage box;

a first pair of legs, each of said legs having an upper portion pivotally secured proximal to said first end of said storage box, said legs having a first support position depending downwardly from said storage box and a second transport position alongside said storage box;

a second pair of legs, each of said legs having an upper portion pivotally secured proximal to said second end of said storage box, said legs having a first support position depending downwardly from said storage box and a second transport position alongside said storage box;

a pair of end supports pivotally mounted to said top surface of said work platform proximal to said first and second ends thereof;

a clamping bar extending through a hole in said horizontal work platform, said clamping bar capable of vertical adjustment, said clamping bar having a terminal end;

a clamping mechanism in said hole in said horizontal work platform capable of retaining said clamping bar: and an adjustable ski boot dummy, said ski boot dummy having a front part, a rear part, an intermediate part interconnecting said front part and a means for removably securing said ski boot dummy to said terminal end of said clamping bar, wherein said ski boot dummy is inserted into the binding of said alpine eguipment correspondingly as a ski boot.

2. The portable ski and snowboard tuning table of claim 1, wherein said storage box further includes openings in said horizontal work platform to allow access into the interior of said storage box and covers that are securable over said openings.

3. The portable ski and snowboard tuning table of claim 1, wherein said work platform is larger than said storage box and overhangs the sides of said storage box, preventing accumulation of debris from said adjustment and tuning of alpine equipment on said first and second pairs of legs.

4. The portable ski and snowboard tuning table of claim 1, wherein said alpine equipment includes downhill alpine skis, telemarking skis, cross country skis, parabolic skis, powder skis and snowboards.

5. The portable ski and snowboard tuning table of claim 1, said clamping bar further comprising:

means for attaching said ski boot dummy to said clamping bar permitting attachment of the dummy in a first position, in which the bottom side of the alpine equipment is turned upwards, and second and third positions, in which either of the side edges of the alpine equipment are turned upwards.

6. A portable ski and snowboard tuning device for allowing a user to tune alpine equipment in any location comprising, in combination:

a storage box having an interior compartment, sides, a first end, a second end and a top edge;

a horizontal work platform having a top surface, a first end and a second end, said work platform mounted on said top edge of said storage box, said work platform having openings therein to access said interior compartment of said storage box;

a first pair of legs, each of said legs having an upper portion and a lower portion, each upper portion pivotally secured proximal to said first end of said storage box using a threaded fastener, said legs and said fasteners cooperating to maintain said legs in a first support position depending downwardly from said storage box and a second transport position alongside said storage box;

a second pair of legs, each of said legs having an upper portion and a lower portion, each upper portion pivotally secured proximal to said second end of said storage box using a threaded fastener, said legs and said fasteners cooperating to maintain said legs in a first support position depending downwardly from said storage box and a second transport position alongside said storage box;

a pair of end supports pivotally mounted to said top surface of said work platform proximal to said first and second ends thereof;

a clamping mechanism, said clamping mechanism cooperating with said end supports to receive and maintain alpine equipment securely in either a vertical or horizontal position for the adjustment and tuning thereof.

7. The portable ski and snowboard tuning table of claim 6, wherein said storage box further comprises covers that are securable over the openings provided for access thereto.

8. The portable ski and snowboard tuning table of claim 6, wherein said work platform is larger than said storage box and overhangs the sides of said storage box, preventing accumulation of debris from said adjustment and tuning of alpine equipment on said first and second pairs of legs.

9. The portable ski and snowboard tuning table of claim 6, wherein said alpine equipment includes downhill alpine skis, telemarking skis, cross country skis, parabolic skis, powder skis and snowboards.

10. The portable ski and snowboard tuning table of claim 6, said central vise assembly comprising:

a clamping bar extending through a hole in said horizontal work platform, said clamping bar having a terminal end; and a clamping mechanism in said hole in said horizontal work platform capable of retaining said clamping bar; and an adjustable ski boot dummy, said ski boot dummy having a front part corresponding to the toe portion of a ski boot, a rear part corresponding to the heel portion of a ski boot, an intermediate part interconnecting said front part with said rear part, and a means for removably securing said ski boot dummy to said terminal end of said clamping bar, said ski boot dummy to be inserted into the binding of said alpine equipment correspondingly as a ski boot and secured in a first position, in which the bottom side of the alpine equipment is turned upwards, and second and third positions, in which either of the side edges of the alpine equipment are turned upwards, wherein at least one of said front and rear parts can be displaced along said intermediate part and can be secured thereto in positions corresponding to the desired binding size.

11. A portable ski and snowboard tuning device for allowing a user to tune alpine equipment in any location comprising:

a storage box having a top edge, a first end and a second end;

a horizontal work platform having a first end and a second end, said work platform mounted on said top edge of said storage box;

a first pair of legs, pivotally secured proximal to said first end of said storage box;

a second pair of legs, pivotally secured proximal to said second end of said storage box;

a pair of end supports pivotally mounted to said top surface of said work platform proximal to said first and second ends thereof;

a clamping bar extending through a hole in said horizontal work platform, said clamping bar having a terminal end an adjustable ski boot dummy removably secured to said terminal end of said clamping bar, said ski boot dummy to be inserted into the binding of said alpine equipment correspondingly as ski boot; and a clamping mechanism in said hole in said horizontal work platform capable of maintaining said clamping bar at a vertically adjustable height, said pair of end supports, said ski boot dummy, said clamping bar and said clamping mechanism cooperating to retain said alpine equipment in a rigid position leaving unobstructed access to the bottom surface and edges thereof.

* * * * *